(12) United States Patent
Thomas et al.

(10) Patent No.: US 7,058,485 B2
(45) Date of Patent: Jun. 6, 2006

(54) SYSTEM FOR CONTROLLING OPERATIONAL SEQUENCES

(75) Inventors: Martin Thomas, Kraichtal (DE); Bernd Illg, Eppingen (DE)

(73) Assignee: Robert Bosch GmbH, Stuttgart (DE)

( * ) Notice: Subject to any disclaimer, the term of this patent is extended or adjusted under 35 U.S.C. 154(b) by 51 days.

(21) Appl. No.: 10/415,125

(22) PCT Filed: Oct. 23, 2001

(86) PCT No.: PCT/DE01/03970

§ 371 (c)(1),
(2), (4) Date: Oct. 8, 2003

(87) PCT Pub. No.: WO02/35297

PCT Pub. Date: May 2, 2002

(65) Prior Publication Data

US 2004/0054447 A1    Mar. 18, 2004

(30) Foreign Application Priority Data

Oct. 23, 2000    (DE) ............................... 100 52 570

(51) Int. Cl.
*G05B 19/042*    (2006.01)
*F02D 41/26*    (2006.01)

(52) U.S. Cl. ............................. 701/1; 701/29; 701/35; 717/120; 710/8

(58) Field of Classification Search ................... 701/1, 701/29, 35, 36; 710/8, 10; 717/100, 120
See application file for complete search history.

(56) References Cited

U.S. PATENT DOCUMENTS

| | | | |
|---|---|---|---|
| 5,379,431 A * | 1/1995 | Lemon et al. ................. 710/10 |
| 5,444,642 A * | 8/1995 | Montgomery et al. ......... 702/91 |
| 5,566,346 A * | 10/1996 | Andert et al. .................. 710/8 |
| 5,794,165 A | 8/1998 | Minowa et al. ................. 701/1 |
| 6,185,491 B1 * | 2/2001 | Gray et al. .................... 701/36 |
| 6,362,730 B1 * | 3/2002 | Razavi et al. ................ 340/438 |
| 6,377,860 B1 * | 4/2002 | Gray et al. .................... 700/83 |
| 6,718,533 B1 * | 4/2004 | Schneider et al. .......... 717/100 |

FOREIGN PATENT DOCUMENTS

EP    0 987 424    3/2000

* cited by examiner

*Primary Examiner*—Tan Q. Nguyen
(74) *Attorney, Agent, or Firm*—Kenyon & Kenyon, LLP

(57) ABSTRACT

A system for controlling operating sequences, in particular in a motor vehicle, is described. The system contains program modules for controlling the operating sequences, and the program modules themselves and/or the program modules in their totality are divided into a hardware-dependent portion and a hardware-independent portion, so that the hardware-dependent portion and the hardware-independe+nt portion exchange physical variables.

7 Claims, 3 Drawing Sheets

SYSTEM FOR CONTROLLING OPERATIONAL SEQUENCES

FIELD OF THE INVENTION

The present invention relates to a system for controlling operating sequences, in particular in a motor vehicle.

BACKGROUND INFORMATION

Embedded software, e.g., in engine control units, is composed of various program modules. Microcontrollers are used in the control units to execute the program modules. Input and output variables which are recorded and output, respectively, by the microcontroller hardware are stored in the controller registers. In control units in known methods heretofore, the hardware of the microcontroller was accessed directly from the functional program parts. In the functional program parts, the computer variables in input signals are converted into physical values, (e.g., temperature in K) and then are processed further on a physical level. The physical results in output variables are converted into computer variables and written to the register.

Therefore, in switching to another controller, the functional modules must also be altered, i.e., adapted to the new hardware.

This shows that the related art is not capable of yielding optimum results in all regards, and therefore this situation is to be optimized, and controller independence of the application software is to be created.

SUMMARY OF THE INVENTION

The present invention is directed to a system for controlling operating sequences, in particular in a motor vehicle, the system containing program modules for controlling the operating sequences.

In an advantageous manner, the program modules themselves and/or the program modules in their entirety are divided into a hardware-dependent portion and a hardware-independent portion, so that the hardware-dependent portion and the hardware-independent portion exchange physical variables.

In the new concept, the program modules are advantageously divided into a hardware-dependent portion (hardware encapsulation) and a hardware-independent portion (application software). In the hardware encapsulation, services are expediently made available to the application software, these services accessing the hardware registers and reading out the values thus detected and/or downloading predefined values. In order for the application software to be independent of the controller, physical values are transferred at the interface between the hardware encapsulation and the application software. In contrast with the raw value, which is detected as a 10-bit value in one controller and as an 8-bit value in another controller, this is independent of the controller due to the physical values, e.g., temperature in K, detected via an analog-digital converter, for example.

Due to the division into application software and hardware encapsulation and the respective physical interfaces, this achieves the result that a large portion of the software modules may be used on control units having different controllers.

Due to the physical interfaces, the software may be used on controllers of different performance levels (8-bit/10-bit A/D converter). In addition, there is the possibility of having the application software run on controllers from different manufacturers.

Hardware encapsulation delivers and/or receives physical values at the interface independently of the particular application. Therefore, there is the possibility of using the hardware encapsulation independently of the application (engine control/transmission control/ABS/ . . . ) in different control units in which the same controller is used. The hardware encapsulation of a control unit, e.g., of the EDC 16/7 generation, corresponds to a software abstraction layer which provides for a strict separation between hardware and application software (e.g., driving software).

There is evidently no direct connection between the hardware and the application software as shown in FIG. 2. To arrive at hardware information, application functions (application software) must use either the operating system or the hardware encapsulation.

The software concept of hardware encapsulation pursued here requires complete encapsulation of all hardware functions in a lean interface. According to this approach, direct hardware access is no longer necessary for the application software because the hardware encapsulation guarantees the transfer of physical values to a defined interface, regardless of the signal source, as well as competition-free elementary functionality. Therefore, the entire system becomes much more stable and more reliable.

On the basis of this concept, the application software becomes in principle independent of the hardware used. If the hardware properties change, they affect only the hardware encapsulation but not the application functions running on it.

Thus, ultimately the simple design of a project is facilitated by hardware adaptation without modifying the source code. This in turn increases the serviceability of the system.

DETAILED DESCRIPTION

Figure 1:
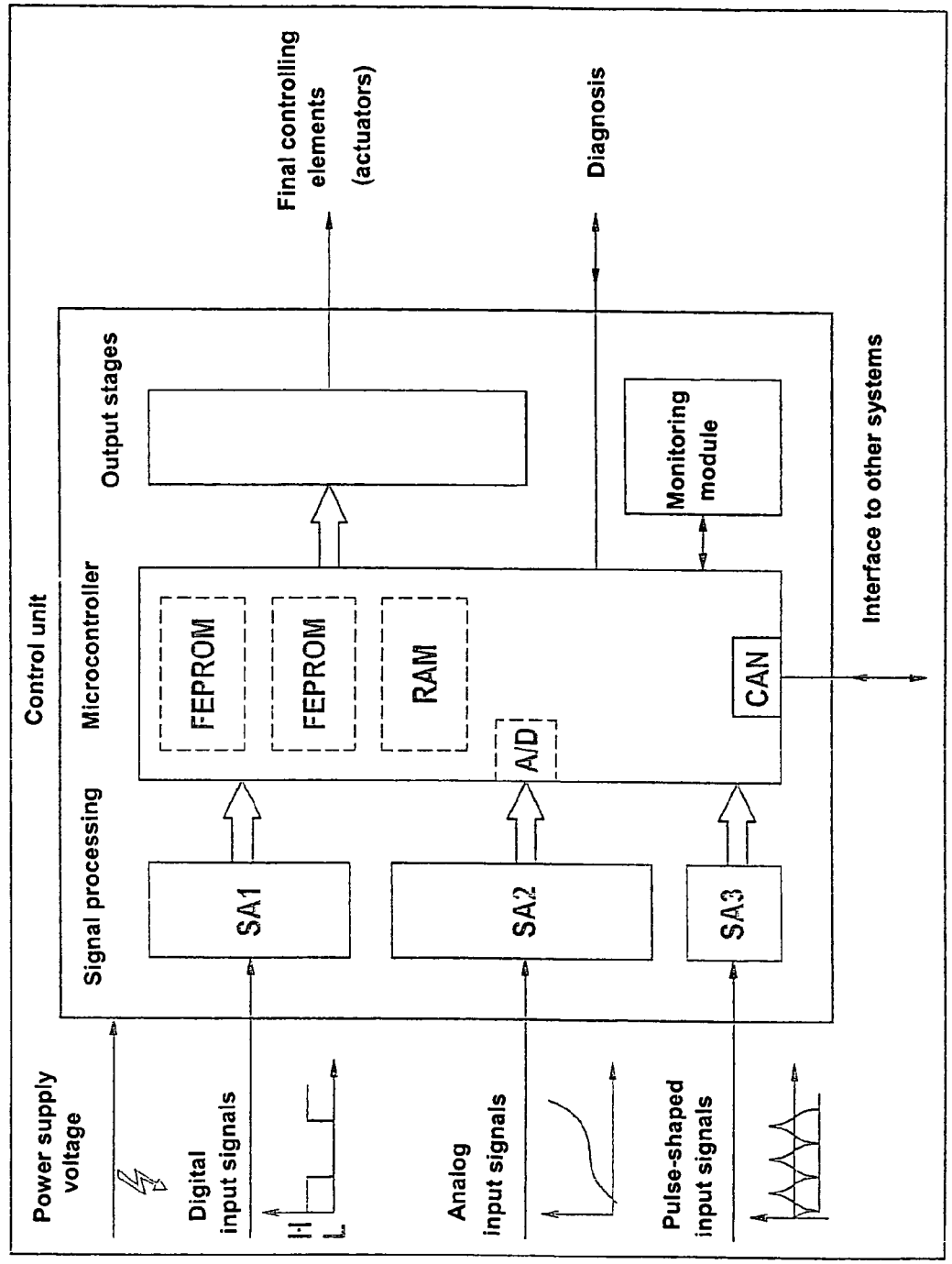
FIG. 1 shows a control unit and the corresponding input and output variables.

The hardware encapsulation of the controller shown in FIG. 1 is freely configurable with regard to the signals to be processed. I/O operations may be performed, e.g., via the multifunctional controller pins and the hardware components DIO, TPU, QADC, SPI, etc.

Figure 3:
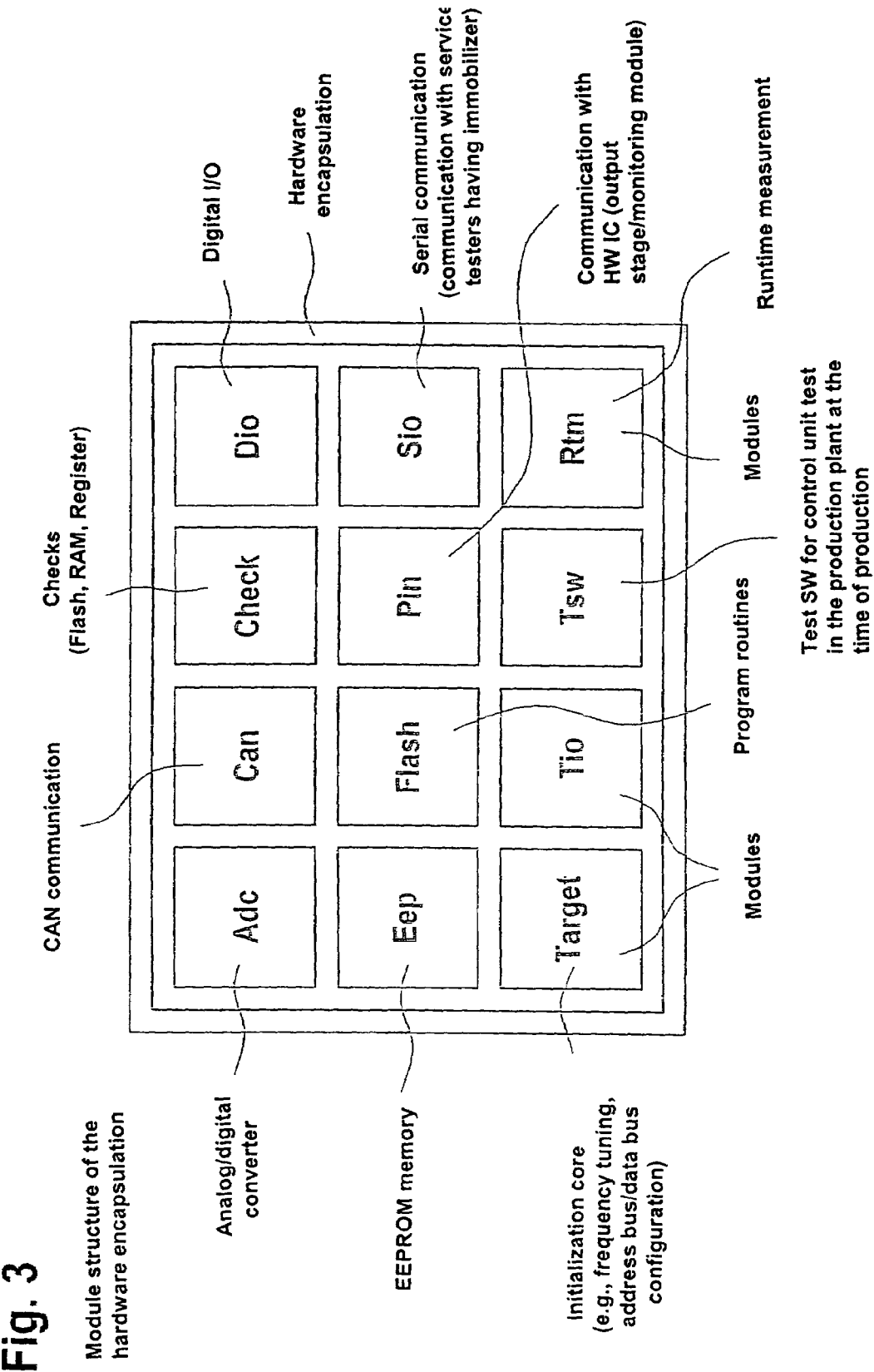
FIG. 3 shows a hardware encapsulation for modules selected as an example.

The object of the developer in the area of hardware encapsulation is mainly to make available a broad spectrum of elementary redundancy-free functionalities (signal analyses, diagnostic functions, etc.). These functionalities are implemented in the form of modules and are combined as a whole in a library, i.e., an archive (see FIG. 3). Individual modules are illustrated in FIG. 3 as an example.

The modules of the hardware capsule are defined logically and according to signal type. In addition, these modules are also oriented physically.

The application software used in the next development stage on this platform is now able to implement a wide variety of customer requirements, always accessing this one archive. The modules that are used and/or the embedded control functions may be configured in accordance with the given requirements.

For example, a control unit illustrated in FIG. 1 is used as the basis for the hardware; it may be used, e.g., for engine control, transmission control, brake control, etc., in a motor vehicle.

With modern digital technology, there are a various possibilities for control and regulation in a motor vehicle. Many influencing variables may be included at the same time, so that the systems may be operated optimally. The control unit receives electric signals from the sensors, analyzes them and calculates the triggering signals for the final controlling elements (actuators). The control program is stored in a memory. Execution of the program is handled by a microcontroller. The components of the control unit are called hardware.

In addition to the actuators as peripherals, sensors form the interface between the vehicle and the control unit as the processing unit. Electric signals from the sensors are sent to the control unit via the cable harness and plug connectors. These signals may have different forms.

Analog input signals may assume any voltage level within a certain range. Examples of physical variables available as analog measured values include the air flow intake, battery voltage, intake manifold pressure and charging pressure, cooling water temperature and intake air temperature. These variables are converted by analog-digital converters (A/D converters) in the microcontroller of the control unit into digital values with which the microprocessor is able to perform its calculations. The maximum resolution of these signals is in 5 mV increments per bit (approx. 1000 increments).

Digital input signals have only two states, namely "high" (logic 1) and "low" (logic 0). Examples of digital input signals include switching signals (on/off) or digital sensor signals such as rotational speed pulses of a Hall sensor or a magnetoresistive sensor. The microcontroller processes these signals directly.

Pulse-shaped input signals from inductive sensors containing information regarding the rotational speed and reference mark are processed in a separate circuit part in the control unit. Interference pulses are suppressed and the pulse-shaped signals are converted into square-wave digital signals.

Signal Preprocessing

Signal preprocessing is performed in blocks SA1, SA2 and/or SA3, depending on the type of input signal. The input signals are limited to allowed voltage levels using suppressor circuits. The useful signal is filtered to remove most of the superimposed interference signals and it is adjusted to the allowed input voltage of the microcontroller (0 through 5 V) by amplification if necessary. Depending on the integration level, signal processing may be performed entirely or partially in the sensor.

Signal Processing

The control unit is the central switching unit for the function sequences of the engine control. The control and regulation algorithms are run in the microcontroller. The input signals supplied by the sensors and the interfaces to other systems are used as input variables. A plausibility check is also performed on them in the computer. The output signals are calculated with the help of the program.

Microcontroller

The microcontroller is the central component of a control unit. It controls its function sequence. In addition to the CPU (central processing unit, i.e., central computing unit), the microcontroller also has input and output channels, timer units, RAM, ROM, serial interfaces, and other peripheral subassemblies integrated on a microchip. A quartz crystal forms the clock for the microcontroller.

Program Memory and Data Memory

The microcontroller requires a program—called the software—for the calculations. The software is in the form of binary numerical values which are organized into data records and stored in a program memory. The CPU reads these values, interprets them as commands and executes the commands in order.

The program is stored on a read-only memory (ROM, EPROM or flash EPROM). In addition, variant-specific data (individual data, characteristic curves and characteristic maps) is also present in this memory. This is invariable data which cannot be altered in operation of the vehicle. This data influences the control sequences and regulation sequences of the program.

The program memory may be integrated into the microcontroller and may also be expanded in a separate component, depending on the application (e.g., through an EPROM or a flash EPROM).

ROM

Program memories may be implemented as ROM (read-only memory), whose content is established at the time of its manufacture and cannot be altered thereafter. The memory capacity of the ROM integrated into the microcontroller is limited. For complex applications, additional memory is necessary.

EPROM

EPROM (erasable programmable ROM) is erased by exposure to UV light and is written again by a programming device. EPROM is usually designed as a separate component. The CPU addresses the EPROM via the address bus/databus.

Flash EPROM (FEPROM)

Flash EPROM is often referred to simply as "flash." It is electrically erasable. Thus, the control units may be reprogrammed at the customer service workshop without having to open them. The control unit is therefore connected to the reprogramming station by a serial interface.

If the microcontroller also contains a ROM, then programming routines for flash programming will be stored there. Flash EPROMs may in the meantime also be integrated into a microchip together with the microcontroller (after EDC 16).

Because of its advantages, flash EPROM has largely replaced the traditional EPROM.

Variable Memory or Working Memory

Such read/write memory is necessary to store variable data (variables), e.g., computation values and signal values.

RAM

All instantaneous values are stored in RAM (random-access memory, i.e., read/write memory). For complex applications, the memory capacity of the RAM integrated into the microcontroller is not sufficient, so an additional RAM module is necessary. It is connected to the microcontroller by the address bus/databus. When the control unit is turned off by the ignition key, the RAM loses its entire data inventory (volatile memory).

EEPROM (Also Called E²PROM)

RAM loses its information when cut off from the voltage supply (e.g., when the ignition is turned off). Data that must not be lost (e.g., codes for the immobilizer and data in the fault memory) must be stored permanently in a permanent nonvolatile memory. EEPROM is an electrically erasable EPROM in which each memory cell is erasable individually, in contrast with flash EPROM. It is also designed for a greater number of write cycles. Thus, the EEPROM may be used as a nonvolatile read-write memory.

ASIC

Because of the ever-increasing complexity of control unit functions, standard microcontrollers available on the market are not adequate. ASIC modules (application specific integrated circuit) are a remedy here. These ICs (integrated circuits) are designed and manufactured according to the specifications of the entity responsible for the development of control units. They contain, for example, an additional RAM as well as input and output channels, and they are able to generate and output PWM signals (see below).

Monitoring Module

The control unit has a monitoring module. The microcontroller and the monitoring module monitor one another through a "question and response cycle." If a fault is detected, each is able to shut down the injection independently of the other.

Output Signals

Using output signals, the microcontroller controls output stages which usually supply enough power for direct connection of final controlling elements (actuators). It is also possible for the output stage to control a relay. The output stages are protected from short circuits to ground or the battery voltage and from destruction due to electric or thermal overload. These faults, as well as severed lines, are detected by the output stage IC, and reported to the microcontroller.

Switching Signals

Final controlling elements may be switched on and off using switching signals (e.g., engine fan).

PWM Signals

Digital output signals may be output as PWM signals. These "pulse-width-modulated" signals are square-wave signals having a constant frequency but a variable on-time (FIG. 3). With these signals, final controlling elements (actuators) may be brought into any working positions (e.g., exhaust gas recirculation valve, fans, heating elements, boost pressure controller).

Communication within the Control Unit

The peripheral components which support the microcontroller in its work must be able to communicate with it. This is done via the address bus/databus. The microcontroller outputs via the address bus, e.g., the RAM address whose memory content is to be read. Then the data belonging to this address is transmitted over the databus. Previous developments in the automotive field have used an 8-bit bus structure, which means that the databus has eight lines over which 256 values may be transmitted. Using the 16-bit address bus conventional with these systems, 65,536 addresses may be addressed. Complex systems today require 16 bits or even 32 bits for the databus. To eliminate pins on the assemblies, the databus and address bus may be combined in a multiplex system, i.e., transmission of the address and the data is staggered using the same lines. For data that need not be transmitted so rapidly, (e.g., fault memory data), serial interfaces having only one data line are used.

EOL Programming

The multiplicity of vehicle variants requiring different control programs and data records necessitates a method of reducing the types of control units required by the vehicle manufacturer. Therefore, the complete memory area of the flash EPROM may be programmed using the program and the variant-specific data record at the end of production of the vehicle (EOL, end-of-line programming). Another possibility is to store multiple data variants (e.g., transmission variants) in the memory, a variant then being selected by coding at the end of the assembly line. This coding is stored in the EEPROM. According to FIG. 2, the actual hardware of the system thus presented has an interface SS1 to the hardware encapsulation and an interface SS2 to the operating system. Due to the services in the hardware encapsulation or interface SS1 itself mentioned above, the hardware encapsulation is then able to have reading and/or writing access to the hardware register in the hardware.

At interface SS5, the hardware encapsulation then exchanges physical values with the application software, which yields the advantages mentioned above.

The existing operating system is linked to the application software via an interface SS3 and to the hardware encapsulation via SS4. At the same time, the operating system is connected to the actual hardware via interface SS2.

Figure 2:
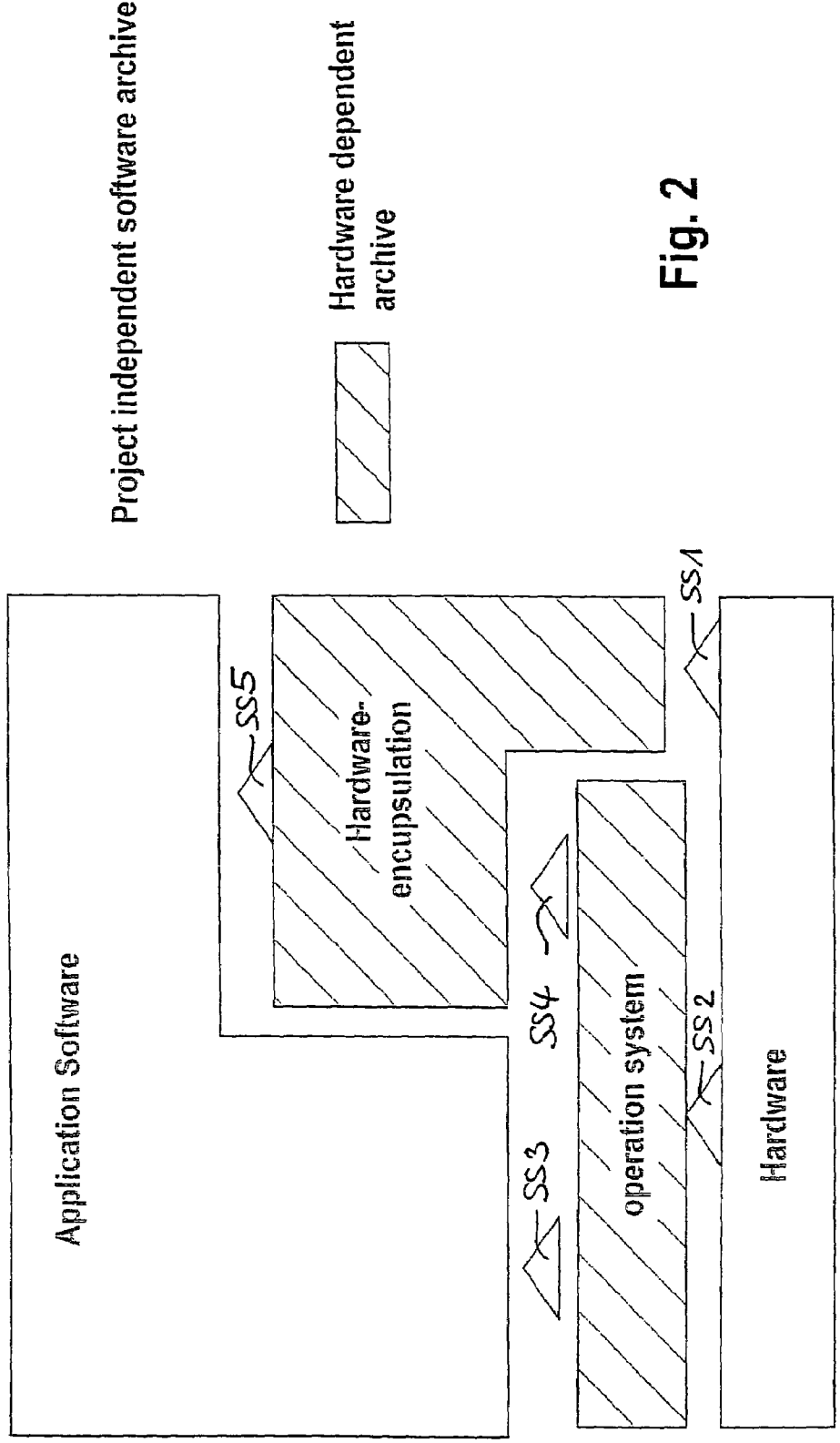
FIG. 2 shows a division according to the present invention into application software and hardware-dependent software by the operating system and hardware encapsulation.

Due to this arrangement according to FIG. 2, the hardware-independent portion may be compiled in archives, i.e., libraries, which may be reused, so that project-independent archiving in the application software is obtained and may be placed on a hardware-dependent hardware encapsulation and/or a hardware-dependent operating system, depending on the application, in different projects.

What is claimed is:

1. A system for controlling operating sequences, comprising:
    program modules for controlling the operating sequences, wherein:
        the program modules are divided into a hardware-dependent portion and a hardware-independent portion, so that the hardware-dependent portion and the hardware-independent portion exchange physical variables; and
    each module of the hardware-dependent portion corresponds to one of only one functionality and only one hardware signal.

2. The system as recited in claim 1, wherein: the system controls the operating sequences in a motor vehicle.

3. The system as recited in claim 1, further comprising: a first interface, wherein:
    the hardware-dependent portion of the program modules is combined in a hardware encapsulation and is separated from the hardware-independent portion in such a way that the hardware-dependent portion and the hardware-independent portion exchange the physical variables over the first interface.

4. The system as recited in claim 3, further comprising:
    a second interface arranged in the hardware-independent portion, the second interface being provided with an operating system.

5. The system as recited in claim 4, further comprising:
    a third interface via which the hardware encapsulation and the operating system are connected.

6. The system as recited in claim 3, wherein:
   the hardware encapsulation has another interface with the actual hardware of the system.

7. The system as recited in claim 1, wherein the program modules of the hardware-dependent portion are combined in a library, each module of the library being independently configurable.

* * * * *